(12) United States Patent
Zomaya et al.

(10) Patent No.: US 7,577,948 B2
(45) Date of Patent: *Aug. 18, 2009

(54) SYSTEM AND METHOD FOR PROVIDING COMPUTER UPGRADE INFORMATION

(75) Inventors: Christ J. Zomaya, Newport Beach, CA (US); Michael R. Berry, Long Beach, CA (US)

(73) Assignee: Upgradedetect, Inc., Irvine, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 10/914,817

(22) Filed: Aug. 10, 2004

(65) Prior Publication Data

US 2006/0037012 A1 Feb. 16, 2006

Related U.S. Application Data

(63) Continuation-in-part of application No. 10/914,927, filed on Aug. 10, 2004, now Pat. No. 7,117,355, which is a continuation of application No. PCT/US03/20756, filed on Jul. 2, 2003.

(51) Int. Cl.
*G06F 9/44* (2006.01)
(52) U.S. Cl. .................... 717/168; 717/172; 717/177
(58) Field of Classification Search .......... 717/168–178
See application file for complete search history.

(56) References Cited

U.S. PATENT DOCUMENTS

| | | | |
|---|---|---|---|
| 3,969,723 A | 7/1976 | Kennicott | |
| 4,558,413 A | 12/1985 | Schmidt et al. | |
| 4,714,992 A | 12/1987 | Mattson, et al. | |
| 4,974,157 A | 11/1990 | Winfield et al. | |
| 5,038,294 A | 8/1991 | Arakawa et al. | |
| 5,109,484 A | 4/1992 | Hughes et al. | |
| 5,499,347 A | 3/1996 | Kuwabara et al. | |
| 5,530,753 A | 6/1996 | Easter et al. | |
| 5,665,951 A | 9/1997 | Newman et al. | |
| 5,758,071 A | 5/1998 | Burgess et al. | |
| 5,796,633 A | 8/1998 | Burgess et al. | |

(Continued)

OTHER PUBLICATIONS

Re-hosting the operational flight program for a tactical fighter plane's radar data processor: a software upgrade methodology, Murray, J.P.; Cole, C.K.; Warlick, E.S.; vol. 2, May 20-23, 1996 pp. 490-496, IEEE.*

(Continued)

*Primary Examiner*—Wei Y Zhen
*Assistant Examiner*—Satish Rampuria
(74) *Attorney, Agent, or Firm*—Vista IP Law Group LLP

(57) ABSTRACT

Systems and methods are disclosed which provide upgrade information for at least one computer. The method includes the steps of executing an upgrade program stored in a computer-readable medium on the at least one computer, detecting a current hardware configuration of the at least one computer, cross-referencing at least some of the information gathered during the detecting step with product specifications contained in a database, identifying an upgrade package for upgrading the at least one computer, wherein the identification of the upgrade package is based at least partially upon the information gathered during the detecting step and cross-referenced with the product specification database, and recommending use of the upgrade package for upgrading the at least one computer. The system and method may be used to provide upgrade information on a plurality of networked computers.

3 Claims, 5 Drawing Sheets

U.S. PATENT DOCUMENTS

| | | | |
|---|---|---|---|
| 5,809,329 A | 9/1998 | Enstrom et al. | |
| 5,826,102 A | 10/1998 | Escobar et al. | |
| 5,845,077 A | 12/1998 | Fawcett | |
| 5,864,823 A | 1/1999 | Levitan | |
| 5,867,714 A * | 2/1999 | Todd et al. | 717/172 |
| 5,870,549 A | 2/1999 | Bobo | |
| 5,909,581 A | 6/1999 | Park | |
| 5,913,040 A | 6/1999 | Barkat et al. | |
| 5,918,211 A | 6/1999 | Sloan | |
| 5,948,061 A | 9/1999 | Merriman et al. | |
| 5,948,104 A | 9/1999 | Lando et al. | |
| 5,960,189 A | 9/1999 | Stupek, Jr. et al. | |
| 5,995,405 A | 11/1999 | Trick | |
| 5,999,989 A | 12/1999 | Patel | |
| 6,006,034 A | 12/1999 | Port et al. | |
| 6,009,409 A | 12/1999 | Gibbons et al. | |
| 6,009,410 A | 12/1999 | Benson et al. | |
| 6,011,537 A | 1/2000 | Slotznick | |
| 6,014,698 A | 1/2000 | Griffiths | |
| 6,018,710 A | 1/2000 | Bensonet al. | |
| 6,035,423 A | 3/2000 | Hodges et al. | |
| 6,052,531 A | 4/2000 | Nachenberg et al. | |
| 6,073,214 A | 6/2000 | Fawcett | |
| 6,101,485 A | 8/2000 | Fortenberry et al. | |
| 6,101,486 A | 8/2000 | Brisebois et al. | |
| 6,119,165 A | 9/2000 | Fawcett | |
| 6,151,643 A | 11/2000 | Cheng et al. | |
| 6,167,407 A | 12/2000 | Sobel et al. | |
| 6,170,065 B1 | 1/2001 | Kobata et al. | |
| 6,195,750 B1 | 2/2001 | Ellsworth | |
| 6,202,207 B1 | 3/2001 | Donohue | |
| 6,230,199 B1 | 5/2001 | Lingarkar et al. | |
| 6,301,612 B1 | 10/2001 | Lenzmeier et al. | |
| 6,317,789 B1 | 11/2001 | Barkat et al. | |
| 6,327,617 B1 | 12/2001 | Fawcett | |
| 6,330,715 B1 | 12/2001 | Razzaghe-Ashrafi | |
| 6,338,149 B1 | 1/2002 | Ciccone, Jr. et al. | |
| 6,347,398 B1 | 2/2002 | Parthasarathy et al. | |
| 6,370,578 B2 | 4/2002 | Lingarkar et al. | |
| 6,405,327 B1 | 6/2002 | Hansen et al. | |
| 6,453,347 B1 | 9/2002 | Lingarkar et al. | |
| 6,467,088 B1 | 10/2002 | Alsafadi et al. | |
| 6,469,742 B1 | 10/2002 | Lord et al. | |
| 6,516,345 B1 | 2/2003 | Kracht | |
| 6,636,961 B1 | 10/2003 | Braun et al. | |
| 6,675,382 B1 * | 1/2004 | Foster | 717/177 |
| 6,711,676 B1 | 3/2004 | Berry et al. | |
| 6,711,738 B1 | 3/2004 | Muehlenstedt et al. | |
| 6,795,965 B1 * | 9/2004 | Yadav | 717/168 |
| 6,990,660 B2 * | 1/2006 | Moshir et al. | 717/171 |
| 7,117,348 B2 * | 10/2006 | Holmberg et al. | 713/1 |
| 2001/0001146 A1 | 5/2001 | Petersen | |
| 2001/0047514 A1 | 11/2001 | Goto et al. | |
| 2001/0052121 A1 | 12/2001 | Masusda et al. | |
| 2002/0002704 A1 | 1/2002 | Davis et al. | |
| 2002/0004935 A1 | 1/2002 | Huotari et al. | |
| 2002/0016956 A1 | 2/2002 | Fawcett | |
| 2002/0026324 A1 | 2/2002 | Okada | |
| 2002/0092009 A1 | 7/2002 | Freeman et al. | |
| 2003/0066057 A1 * | 4/2003 | RuDusky | 717/140 |
| 2004/0015949 A1 * | 1/2004 | Taylor | 717/171 |
| 2004/0030880 A1 * | 2/2004 | Kitagawa | 713/1 |
| 2004/0031030 A1 * | 2/2004 | Kidder et al. | 717/172 |
| 2004/0054767 A1 | 3/2004 | Karaoguz et al. | |
| 2004/0158818 A1 * | 8/2004 | Smith et al. | 717/127 |
| 2005/0149925 A1 * | 7/2005 | Pichetti et al. | 717/177 |
| 2006/0020936 A1 * | 1/2006 | Wyatt | 717/162 |
| 2007/0028226 A1 * | 2/2007 | Chen et al. | 717/168 |

OTHER PUBLICATIONS

A case study of dependable software upgrade with distributed components, Li, J.J.; Xueshan Shan, 2002, pp. 1028-1033, IEEE.*
Towards upgrading actively replicated servers on-the-fly, Solarski, M.; Meling, H., 2002, pp. 1038-1043, IEEE.*

* cited by examiner

SYSTEM AND METHOD FOR PROVIDING COMPUTER UPGRADE INFORMATION

RELATED APPLICATIONS

This application is a continuation-in-part of U.S. patent application Ser. No. 10/914,927, filed on Aug. 10, 2004, now issued as U.S. Pat. No. 7,117,355, which itself is a continuation of PCT Application No. PCT/US03/20756 filed on Jul. 2, 2003, which itself claims priority to U.S. patent application Ser. No. 10/271,101 filed on Oct. 15, 2002, now issued as U.S. Pat. No. 6,711,676. The above-identified Applications are incorporated by reference as if set forth fully herein.

FIELD OF INVENTION

The present invention relates generally to computer systems and computer networks. More particularly, the present invention relates to a system and method for providing computer upgrade information based upon component-related data present on a client computer.

INCORPORATION BY REFERENCE

The contents of each U.S. patent or other reference, if any, cited in this application, are hereby incorporated herein by reference.

BACKGROUND OF INVENTION

The computer has become a permanent fixture in society. Computers are used to facilitate data communications and electronic commerce between businesses, and to gather various types of data such as news, stock market quotes, research facts, sport scores, etc. Furthermore, computers serve as a source of entertainment through audio and/or visual output display. Just about every aspect of daily life is affected by computers.

The high technology environment of computers is constantly changing. Typically, staying current with evolving computer technology requires the user to choose between the economics of a computer system replacement or a computer system upgrade. In a computer system upgrade, users attempt to choose upgrade hardware most appropriate for their particular needs and operating environment. For example, common upgrade hardware considerations include faster processor speed, enhanced video capabilities, increased memory, network capabilities, particular I/O devices, etc. For a vendor to provide a meaningful computer upgrade recommendation, the vendor must typically gather information from the user regarding the hardware and software configuration of the user's client computer.

Such data gathering methods include phone or mail surveys, and registration packets filled out by the user after purchase of the computer components or system. Another data gathering method involves electronic transfer of data from the user to the vendor. For example, the user enters information about the user's computer via on-screen menus, and the information is transmitted to a server computer generally via the Internet, regarding the model of the users computer. The user is then presented with information about their system including upgrade products and paths. Although this method offers upgrade options and is viewed by many as an improvement over prior methods, its success is dependent on the user's knowledge of the client computer's current configuration.

Another method described in U.S. Pat. No. 6,370,578, issued Apr. 9, 2002 and titled "Active Marketing Based On Client Computer Configurations", uses a product information database which contains product signatures. The client's system is scanned (e.g., by server software) for the presence of the product signatures corresponding to each product in the product information database to determine if each product is present on the client computer. This method relies less on the user's actual knowledge of his or her client computer than does the previously-described methods, but nonetheless this method is very inefficient because most of the products scanned for are typically not present on the client's computer. Further, the data gathered from such scanning is not always accurate and/or complete enough to allow the vendor to make an optimal upgrade recommendation. This is due to inherent limitations in the manner in which industry-standard SMBIOS (System Management Basic Input/Output System) and SPD (Serial Presence Detect) data is created, reported, accessed, and/or used in combination with other data to determine the true system state of a client computer.

Since optimizing the accuracy of an upgrade recommendation results in enhanced product reliability and component compatibility, an accurate upgrade recommendation should be based on the most reliable data in determining the current system configuration. Accordingly, there is a need for a system and method of providing upgrade information for a computer that is more accurate, efficient, and reliable than known methods.

SUMMARY

Systems and methods are disclosed which provide upgrade information for a client computer. The detection of a current hardware configuration of the client computer is facilitated by: 1) reading serial presence detect (SPD) data from the client computer; 2) reading motherboard parameters (such as the product ID and manufacturer ID of the motherboard); and/or 3) identifying the SPD write-protect status of the SPD chip on the client computer. Additionally or alternatively, detection of the current hardware configuration may be facilitated by: 4) reading other OS data such as system name and operating system version and/or performing tests to determine certain computer characteristics such as memory utilization or CPU speed. In most instances, the information gathered is cross-referenced with a proprietary database of product specifications, to confirm the information is accurate.

The current hardware configuration of the client computer is then compared to a target hardware configuration to identify an upgrade package for upgrading the client computer to the target hardware configuration, and a recommendation is provided to use the upgrade package for upgrading the client computer. Identification of the upgrade package is based at least partially upon the information gathered.

The method of the present invention may be carried out by a system of the present invention embodied in computer software. Conceptually, the software includes various modules to accomplish discrete tasks. The modules may be wholly or partially combined, or split into more discrete sub-modules as desired. In general, the system includes: a detect module for detecting a current hardware configuration of the client computer; a compare module for comparing the current hardware configuration to a target hardware configuration to identify an upgrade package for upgrading the client computer to the target hardware configuration; and a recommend module for providing a recommendation to use the upgrade package for upgrading the client computer. An optional cross-reference module is used for cross-referencing information about the current configuration of the client computer, gathered by the detect module, with a product information database.

The detect module detects the hardware configuration of the client computer by performing at least one task from the group of tasks consisting of (a, b, c), or at least one task from the group of tasks consisting of (a, b, c, d, e), to gather information associated with the client computer. Task "a" refers to accessing SPD data from an SPD chip of the client computer. Task "b" refers to accessing motherboard parameters from the memory of the client computer, such as a manufacturer ID and a product ID of the motherboard. Task "c" refers to determining a write-protect status of the serial presence detect chip of the client computer. Task "d" refers to reading OS data such as system name and/or operating system version. Task "e" refers to performing a test or tests to determine certain computer characteristics such as memory utilization and/or CPU speed. The compare module identifies the upgrade package based at least partially upon the information gathered by the detect module.

The method of detecting the current hardware configuration of a client computer, as describe herein, detects the presence or absence of a limited number of target hardware components, as opposed to scanning for each of hundreds or thousands of components within a proprietary product information database. The method of the present invention thus eliminates the time-consuming use of scanning for each item in a product information database. Furthermore, by cross-referencing the information gathered with product specifications in a proprietary product database, the current hardware configuration of the client computer may be determined more accurately than with known methods. Upgrade recommendations may then be made for compatible components with a higher degree of success than with known methods.

In one preferred aspect of the invention, a method provides upgrade information for a computer. The method includes the steps of executing an upgrade program stored in a computer-readable medium on the computer, detecting a current hardware configuration of the computer, cross-referencing at least some of the information gathered during the detecting step with product specifications contained in a database, identifying an upgrade package for upgrading the computer, wherein the identification of the upgrade package is based at least partially upon the information gathered during the detecting step and cross-referenced with the product specification database, and recommending use of the upgrade package for upgrading the computer.

In another preferred aspect of the invention, a method provides upgrade information for a plurality of networked computers. The method includes the steps of executing an upgrade program stored in a computer-readable medium on one of the plurality of networked computers, detecting a current hardware configuration of the plurality of networked computers, cross-referencing at least some of the information gathered during the detecting step for each of the plurality of networked computers with product specifications contained in a database, identifying an upgrade package for at least some of the plurality of networked computers, wherein the identification of the upgrade package is based at least partially upon the information gathered during the detecting step and cross-referenced with the product specification database, and recommending use of the upgrade package for at least some of the plurality of networked computers.

The above-noted method may include the further step of packaging one or more hardware components of the upgrade package, wherein a single package is used for each computer in the plurality of networked computers where upgrading was recommended. Further, the package may be marked to identify the specific computer where upgrading was recommended, thereby facilitating the convenient installation of the upgrade components.

In yet another preferred embodiment of the invention, a system provides upgrade information for at least one computer. The system includes a detect module for detecting a current hardware configuration of the at least one computer, a cross-referencing module for cross-referencing at least some of the information gathered by the detect module with product specifications contained in a database, a compare module for comparing the current hardware configuration to a target hardware configuration to identify an upgrade package for upgrading the at least one computer, wherein the identification of the upgrade package is based at least partially upon the information gathered by the detect module and cross-referencing module, a recommend module for recommending use of the upgrade package for upgrading the at least one computer, and wherein the detect module, the cross-referencing module, the compare module, and the recommend module are stored in a computer-readable medium.

The present invention as described herein thus provides a system and method of recommending an upgrade package for a computer that is more accurate, efficient, and reliable than known systems or methods. Further objects and advantages of the present invention will be apparent in the detailed description which follows, read in conjunction with the accompanying drawings.

DETAILED DESCRIPTION

The present invention describes a system and method of providing a computer upgrade recommendation that is more accurate, efficient, and reliable than known systems and methods. The current hardware configuration of a client computer is detected by reading serial presence detect (SPD) data, reading motherboard parameters (such as the product ID and manufacturer ID of the motherboard), and/or identifying the SPD write-protect status of the SPD chip of the computer. Additionally or alternatively, detection of the current hardware configuration may be facilitated by reading other OS data, and/or performing tests to determine certain computer characteristics. In most instances, the information gathered is cross-referenced with a proprietary database of product specifications, to confirm the information is accurate.

The current hardware configuration of the client computer is then compared to a target hardware configuration which has been established, to identify an upgrade package for upgrading the client computer to the target hardware configuration. Typically, the target hardware configuration is based on industry standards or user preferences. A recommendation is provided to use the upgrade package for upgrading the client computer to the target configuration.

If the user's needs change after the target hardware configuration has been determined, or even after the upgrade package has been determined, the target hardware configuration may be reestablished accordingly, and the current hardware configuration may then be compared to the reestablished target hardware configuration to identify a reestablished upgrade package for upgrading the client computer to the reestablished target hardware configuration, based at least partially upon the information previously gathered regarding the current hardware configuration. The reestablished upgrade package may then be recommended for upgrading the client computer. Thus, as described more fully herein, the present invention provides for systems and methods that recommend upgrade packages for a computer.

Figure 1:
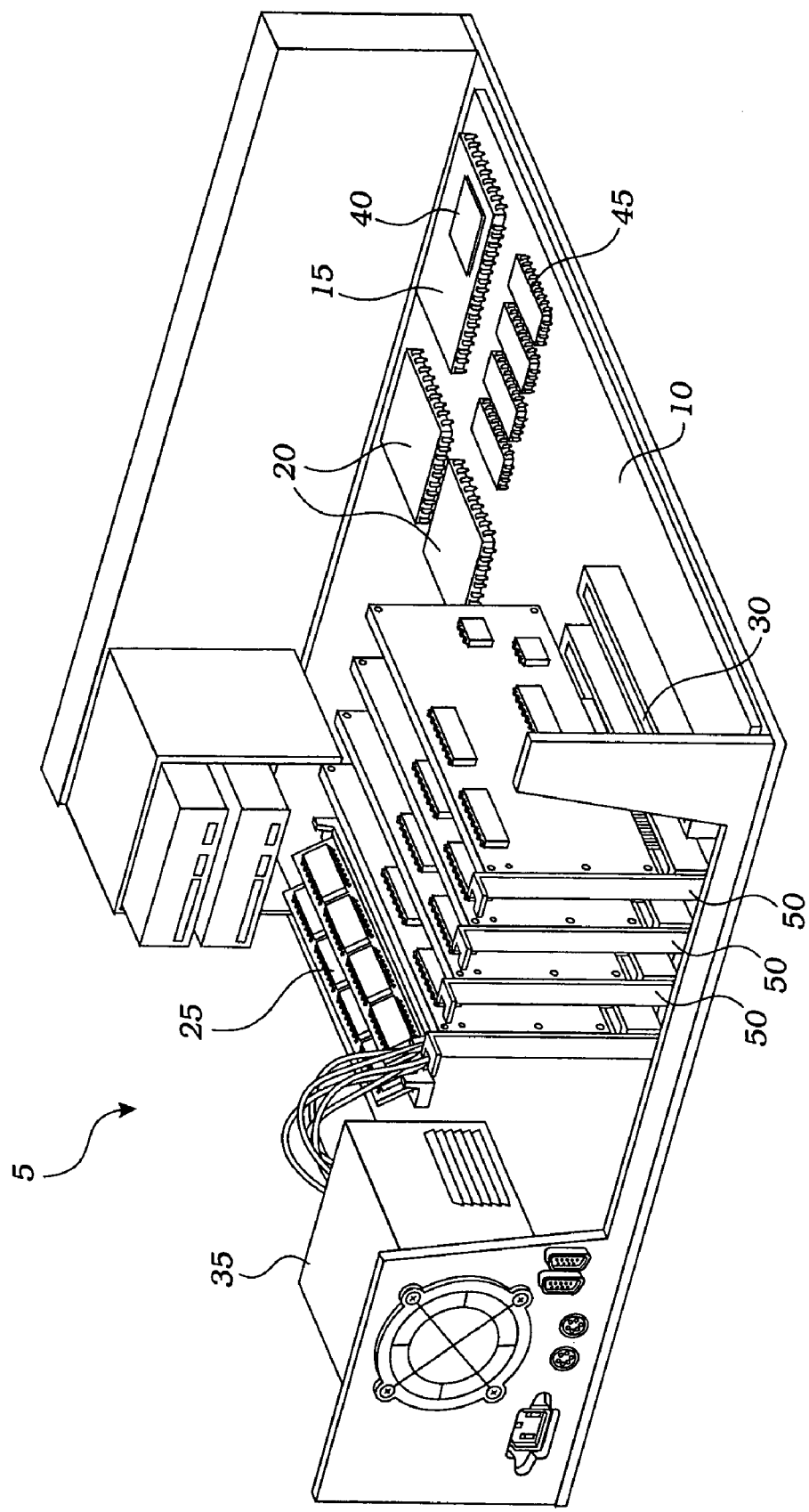
FIG. 1 illustrates a typical computer and motherboard configuration.

Turning now to FIG. 1, a typical client computer 5 and motherboard configuration is shown for reference, and is well-known in the art. Motherboard 10 is sometimes referred to as the mainboard, system board, logicboard, or even maincard or mothercard. Typically, all of the basic circuitry and components required for a computer to function are either contained on or attached to motherboard 10, such as microprocessor or CPU 15, controller or chipset 20, memory modules 25, serial and parallel ports (not shown), expansion slots 30, power supply 35, internal cache 40, external cache 45, and various cards 50 such as a modem card, video card, and sound card. Memory module 25 includes memory chips 55, an SPD chip 60 (typically an EPROM), and an SMBIOS area 65 of RAM for storing SMBIOS data (see FIG. 2). External hardware components (not show) are also well-known in the art, and may include for example, a monitor, keyboard, mouse, printer, scanner, or any temporarily connected device such as a camera, personal digital assistant (PDA), or data storage device.

When computer 5 is first powered up, CPU 15 passes control to the basic input/out system (BIOS) program located in ROM. Boot-up and BIOS processing are well-known in the art. Briefly, BIOS determines whether the computer's components are operational, and then loads OS files from the computer's hard drive or disk drive into the computer's RAM. BIOS takes an inventory of equipment and resources, and loads SMBIOS data such as configuration information and drivers into SMBIOS area 65. For example, the SMBIOS data contains data from chipset 20 regarding the memory module capacity of chipset 20. Additional SMBIOS data includes motherboard parameters 75 such as the manufacturer ID and product ID of motherboard 10. As described herein, the present invention uses some of the data from SMBIOS to determine the current hardware configuration of the client computer 5, and make a proper hardware upgrade recommendation.

Figure 2:
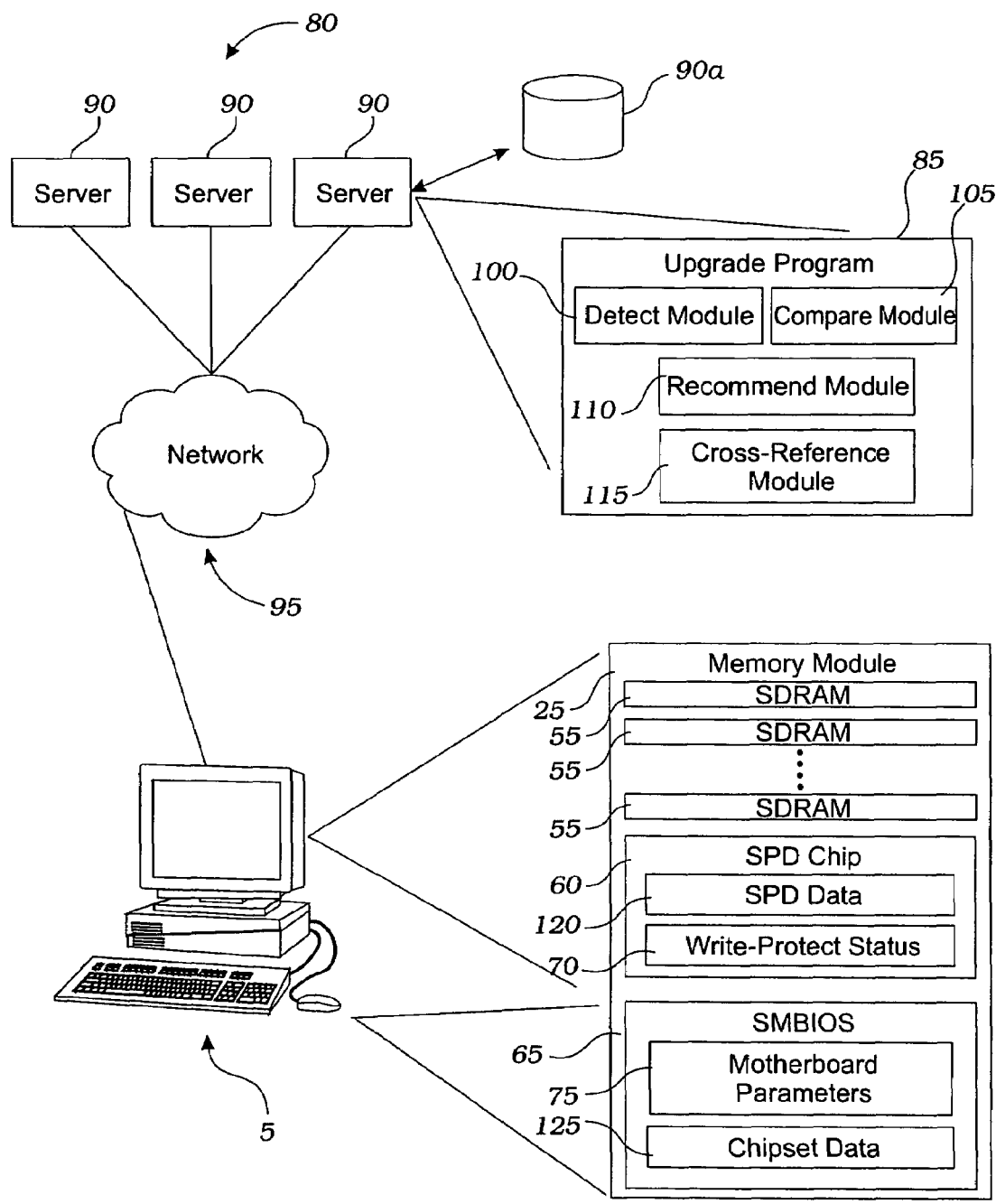
FIG. 2 illustrates a typical network system for facilitating execution of a method of the present invention, along with block diagrams of an upgrade program used in accordance with the present invention, and relevant features of a typical memory module.

Turning now to FIG. 2, a typical computer network system 80 for facilitating execution of a method of the present invention is shown. Also shown in FIG. 2 is a block diagram of upgrade program 85, as well as a block diagram of a memory module 25. In computer network system 80, a plurality of server computers 90 are connected via a communication network 95, such as the Internet, to a client computer 5. One or more servers 90 hosts upgrade program 85, comprised of detect, compare, and recommend modules, 100, 105, and 110, respectively. Upgrade program 85 optionally further comprises cross-reference module 115. Upgrade program 85 is typically embodied in executable computer software, which may run from client computer 5 or server 90, and which may be partially or fully downloaded from server 90 via network 95 to client computer 5.

Detect module 100 is programmed to detect a current hardware configuration of client computer 5, by performing at least one task from the group of tasks consisting of (a, b, c), or at least one task from the group of tasks consisting of (a, b, c, d, e), to gather information associated with client computer 5. Task "a" refers to accessing SPD data 120 from SPD chip 60 of client computer 5. Task "b" refers to accessing motherboard parameters 75 from the memory of client computer 5, for example a manufacturer ID and a product ID of motherboard 10. Task "c" refers to determining a write-protect status (represented by 70) of SPD chip 60 of client computer 5. Task "d" refers to accessing OS data such as system name and/or operating system version. Task "e" refers to performing a test or tests to determine certain computer characteristics such as memory utilization and/or CPU speed.

Compare module 105 is programmed to compare the current hardware configuration of client computer 5 to a target hardware configuration (previously established), to identify an upgrade package for upgrading client computer 5 to the target hardware configuration. Identification of the upgrade package is based at least partially upon the information gathered by detect module 100. Recommend module 110 is programmed to provide a recommendation to use the upgrade package for upgrading client computer 5. Optional cross-reference module 115 is programmed to cross-reference the information gathered by detect module 100, with product specifications in a product information database 90a. Each of the detect, compare, recommend, and cross-reference modules 100, 105, 110, and 115, respectively, are described herein in more detail in connection with FIG. 3.

Still referring to FIG. 2, a block diagram of a typical memory module 25 is shown, illustrating relevant features. Memory module 25 contains multiple memory chips 55 (e.g., SDRAM and/or RAMBUS), an SPD chip 60 which is typically an EPROM, and an SMBIOS area 65 of RAM for storing SMBIOS data such as motherboard parameters 75 obtained directly from motherboard 10 during boot-up, as well as chipset data 125 obtained from chipset 20 during boot-up. SPD chip 60 contains SPD data 120, and may be write-protected (indicated by write-protect status 70). Use of the aforementioned components and data of memory module 25 will be discussed more fully herein.

Figure 3:
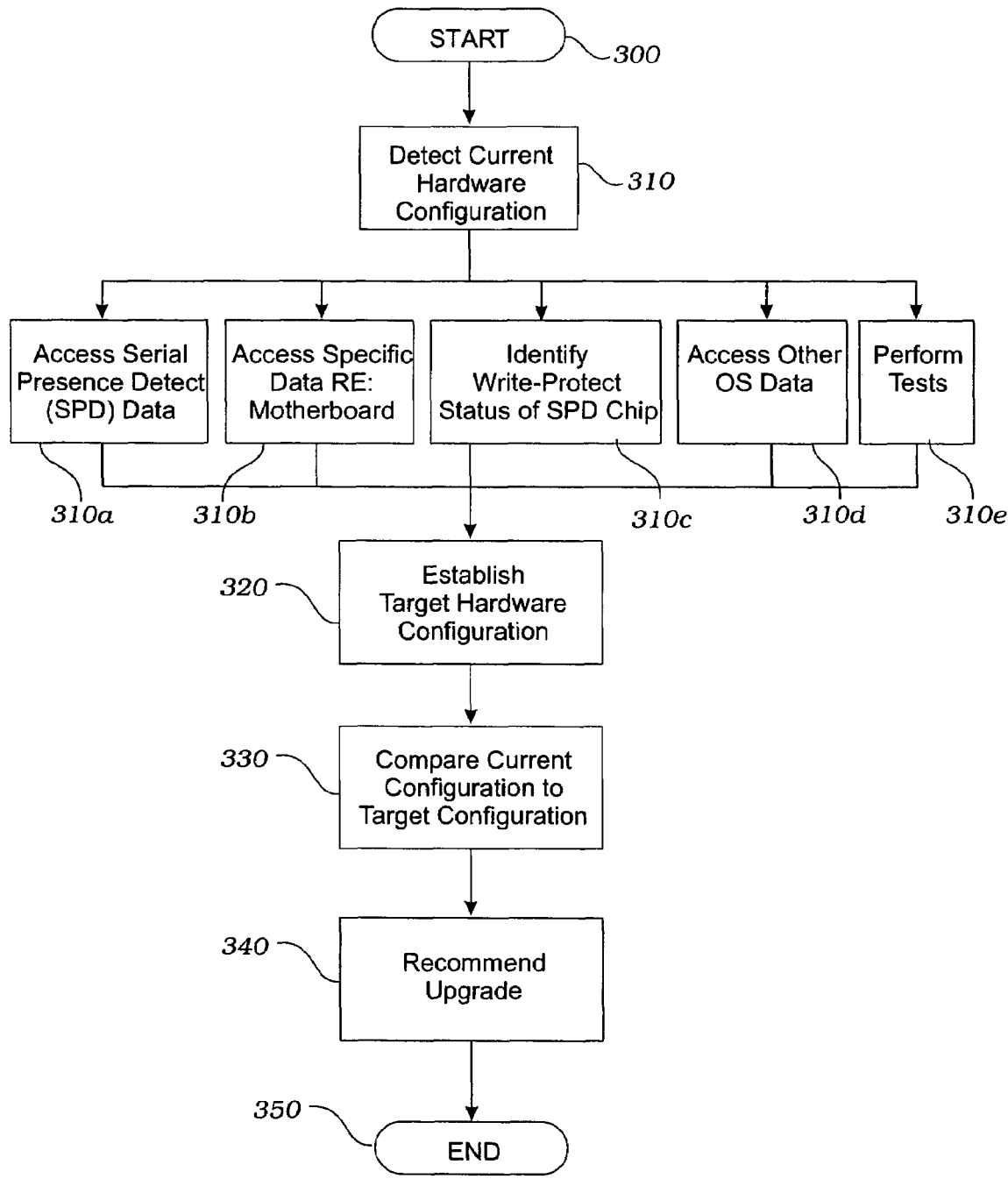
FIG. 3 is a flow chart illustrating a method of providing upgrade information for upgrading a computer according to the present invention.

Turning now to FIG. 3, a flowchart is shown illustrating methods of providing upgrade information for upgrading a computer according to the present invention. The process begins at step 300. At step 310, a current hardware configuration of the client computer is detected. The detection may include one or more of tasks 310a, 310b, 310c, 310d, and 310e discussed more fully herein. At step 320, a target hardware configuration for the client computer is established. The current configuration is then compared to the target configuration at step 330, and a recommendation for an upgrade is provided based upon the results of the comparison, as seen at step 340. The process ends at step 350. Each step will now be discussed in more detail.

Referring now to step 310 in more detail, the current hardware configuration of the client computer is detected. Step 310 may include any combination of one or more of steps 310a, 310b, 310c, 310d, and 310e. In one embodiment of the present invention, step 310 includes at least one of the tasks from the group of tasks consisting of "a", "b", and "c", represented by steps 310a, 310b, and 310c respectively. That is, step 310 may include only step "a", only step "b", only step "c", only steps "a" and "b", only steps "a" and "c", only steps "b" and "c", or all three steps "a", "b", and "c".

In those instances which include step "a", preferably SPD data 120 is cross-referenced with product specifications in database 90a. Similarly, in those instances which include step "b", preferably motherboard parameters 75 are cross-referenced with product specifications in database 90a. Such cross-referencing may be performed by cross-reference module 115, and the benefits thereof are discussed more fully herein.

Detection of the current hardware configuration of the client computer at step 310 may be initiated in various ways. For example, an individual user may request detection through an active link on a website. In that case, upgrade program 85 may run wholly or partially from a server computer over the Internet, or may be downloaded to the client computer at that time to run locally. Or upgrade program 85 may be resident on the client computer or accessible over a local or other computer network. These and other variations are well-known in the art. In any case, the detecting may be performed automatically in response to a single user request. Similarly, the entire process of detecting (310), comparing (330), and recommending (340) may be performed automatically in response to the single user request, which may be received at a computer server over a computer network. Detect, compare, and recommend modules (100, 105, and 110 respectively) may be embodied in an executable computer program 85 as seen in FIG. 2. The entire process may also be programmed to initiate automatically at specified time intervals.

Figure 4:
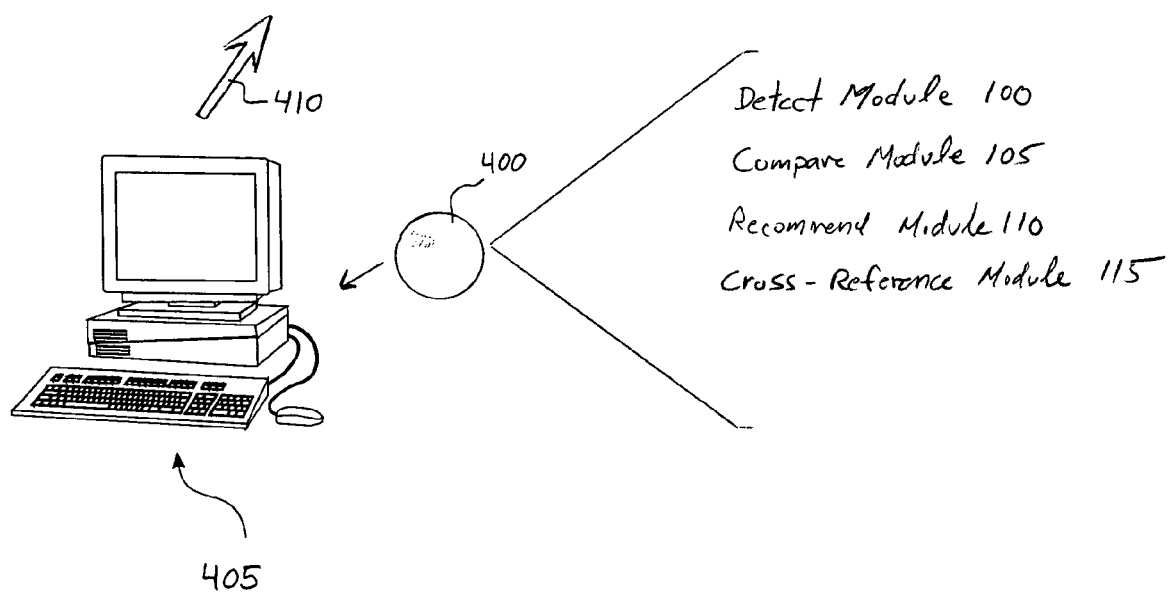
FIG. 4 illustrates a typical computer and a computer-readable medium containing an upgrade program.

For example, with reference to FIG. 4, in one preferred embodiment of the invention, the detect, compare, recommend, and cross-reference modules (100, 105, 110, and 115, respectively) may be embodied in an executable computer program 85 stored in a computer-readable medium 400. The computer-readable medium may include, by way of illustration and not limitation, a magnetically readable diskette, an optically readable disk such as, for example, a CD-ROM or DVD disk, a flash memory device or the like. There are several advantages in storing the various modules (i.e., 100, 105, 110, and 115) onto a computer-readable medium 400.

First, a user may not have access to a remote server 90 via a network 95. In this scenario, a user desiring an upgrade can simply run the upgrade program 85 on the local computer 405. The step of recommending an upgrade (340) may include the generation of an upgrade request 410 which may include, for example, one or more order forms (e.g., invoices) that can then be sent directly to a vendor (or multiple vendors as the case may be) for ordering and delivery of the upgrade components. Second, a user may be restricted (either technically or because of internal policies or the like) from downloading and/or running the upgrade program 85 from a remote server 90. Such might the case, for example, if the local computer 405 is located in a secure location (e.g., a military facility or a corporate network) where it is either undesirable or impossible to download and/or run the upgrade program 85 from a remote server 90.

The above-noted embodiment also contemplates the generation of an upgrade request 410 which can be communicated electronically to a vendor (or multiple vendors as the case may be) for ordering and delivery of the upgrade components. The upgrade request 410 may be communicated via facsimile, e-mail, website link or any other method known to those skilled in the art for communicating data over a computer network. In this regard, the only information that the recipient of the upgrade request 410 is able to see is that actual upgrade components recommended by the upgrade program 85. The recipient is unable to see other information such as, for example, the current hardware configuration of the local computer 405 (or as described below the configuration of multiple computers in a computer network 420). This feature might have particular applications where secrecy is of paramount importance, for instance, in computers used in sensitive military or government matters. Alternatively, individual consumers may simply not want any third party to know personal information regarding their current hardware configuration.

Figure 5:
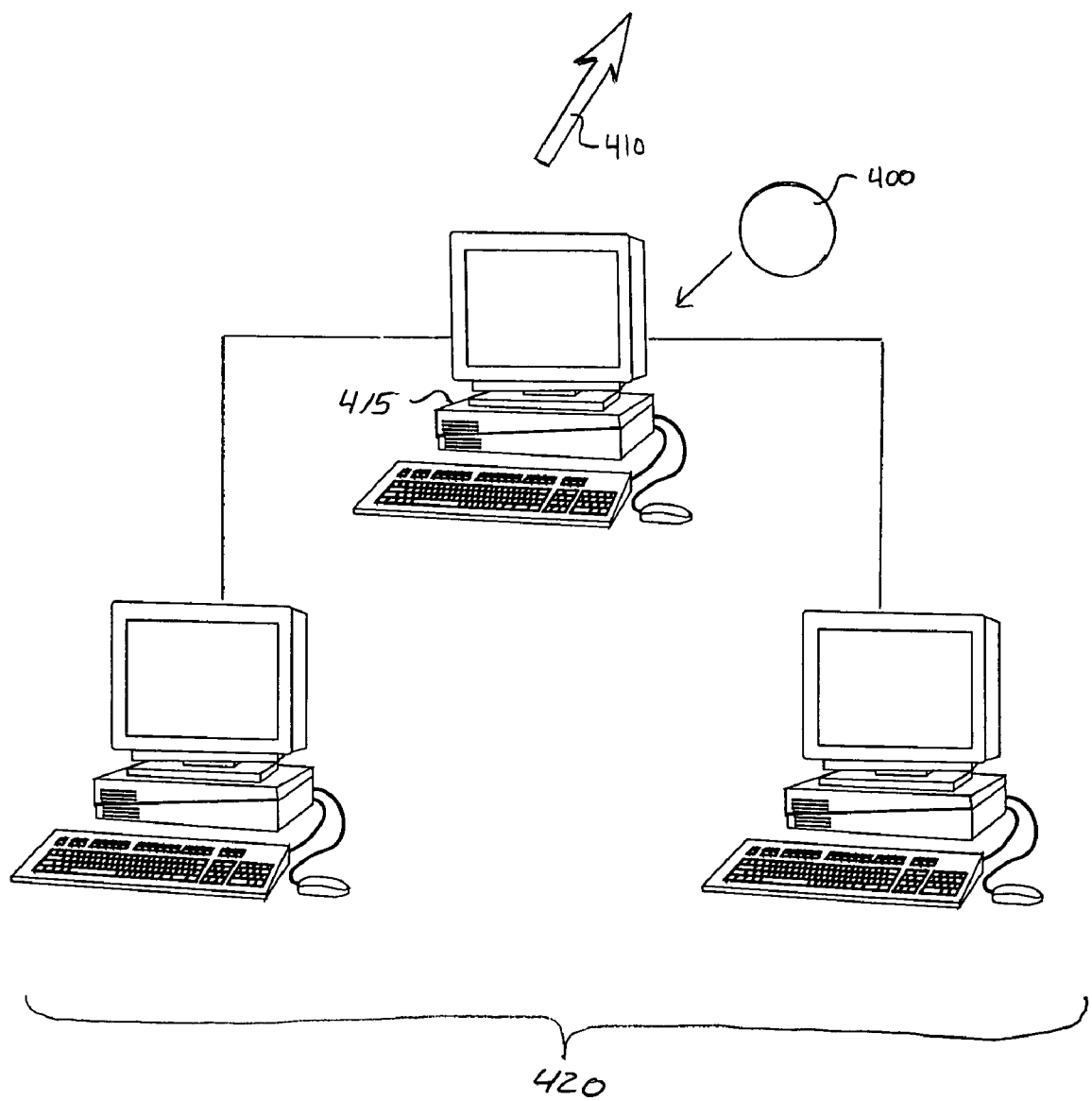
FIG. 5 illustrates a computer network and a computer-readable medium containing an upgrade program being loaded on one of the networked computers.

It should be understood that the above-described example of a single user request may be implemented over a local or other computer network. That is to say that the single user request utilizing an executable computer program 85 stored in a computer-readable medium 400 may be used to provide project-based or network-based upgrade recommendations. FIG. 5 illustrates one such embodiment wherein the executable computer program 85 stored in a computer-readable medium 400 is loaded onto a single computer 415 that is part of a computer network 420. The single computer 415 may include, for example, a network administrator computer.

In one preferred aspect of the invention, a single computer 415 of the computer network 420 is able to execute the upgrade program 85 for each or, alternatively, a plurality of computers in the computer network 420. In this regard, the computer-readable medium 400 does not have to be loaded and executed on each computer of the computer network 420. The single computer 415 preferably is able to generate the upgrade request 410 for each computer in the computer network 420 where an upgrade was recommended. As explained above, this information can then sent directly to a vendor (or multiple vendors as the case may be) for ordering and delivery of the upgrade components.

The present invention is useful not only for providing an upgrade recommendation for a single client computer 5, but also for providing project-based or network-based upgrade recommendations. In this manner, the process may be performed on an entire network automatically or by a single manual request at substantially the same time. If a single user request is initiated to run upgrade program 85 on a network/project, the process preferably includes steps 300-350 for each client computer. That is, if client computer 5 is part of a network comprising additional client computers, the process may: detect the current hardware configurations of each of the additional client computers; establish corresponding target hardware configurations for each of the additional client computers; compare the current hardware configurations of each of the additional client computers to the corresponding target hardware configurations of each of the additional client computers to identify corresponding upgrade packages for upgrading each of the additional client computers to the corresponding target hardware configurations; and recommend use of the corresponding upgrade packages for upgrading each of the additional client computers.

If a particular client computer in the project has not had its current hardware configuration detected (310), and/or not had its target hardware configuration established (320), those steps may be executed on that particular client computer. On the other hand, if the current hardware configuration has been detected (310), and/or the target hardware configuration has been established (320), those steps may be skipped for that particular client computer. This may be accomplished using basic programming logic. The process may proceed on a project basis by performing steps 300-350 consecutively for each client computer, or by performing 310 on each computer, then 320 on each computer, then 330 on each computer, then 340 on each computer. It is simply a matter of preference as to what order the steps of the process are performed when a project-based upgrade recommendation is being executed.

For example, when the present invention is used with project-based upgrade recommendations, the detection step (310) may be executed at various times either individually by particular client computer users, or by a network administrator for multiple client computers on the network. The current hardware configurations of the detected client computers may be stored in a database for future reference. If an individual manually reconfigures his or her client computer (e.g., adding memory), then that user can request re-detection of that client computer, and the updated current hardware configuration may be stored at the database until such time as it is needed for completion of the process.

Similarly, the target hardware configurations of each client computer in a project-based upgrade may be reestablished (320), as needed. The compare step (330) may also be accomplished individually, or on a project-based scale. While each client computer within a project may have its current hardware configuration detected (310) and its corresponding target hardware configuration established (320) individually, in one embodiment of the present invention all client computers in the project will have had their current and target hardware configurations loaded into a project-based database prior to the compare step (330) being performed. In this manner, upgrade program 85 may operate on the entire project based on a single request, with the comparing (330) and recommending (340) steps being performed on each client computer within the project, substantially simultaneously.

Still referring to step 310, the present invention "detects" the presence or absence of specific hardware components on a client computer, as opposed to "scanning" for the presence or absence of those components. Scanning refers to checking each product signature in a product information database against the client computer, to determine the presence or absence of the product. Scanning is described in U.S. Pat. No. 6,370,578, previously discussed in the Background Section of the present application. Scanning is extremely inefficient because the server or upgrade program scans for many items that are not present on the client's computer. The present invention, on the other hand, detects the presence or absence of only a limited number of hardware components of concern, mostly related to memory as described herein (see steps 310a-310e), thereby eliminating the time-consuming use of scanning for each product in a product information database.

Referring now specifically to task "a", represented by step 310a, and with reference to FIG. 2 as well, SPD data 120 such as the capacity, data width, speed, number of row and column addresses, and/or voltage characteristics of memory module 25, may be read directly from SPD chip 60. BIOS uses this information during the power-on self-test (POST) routine to properly configure memory module 25 to optimize reliability and performance. If a memory module 25 does not have an SPD chip 55, BIOS will assume the memory module's information. With some memory, this does not cause problems, but SDRAM typically must have an SPD chip 60 for the computer to successfully boot up.

Known utilities are capable of reading and reporting on SPD data 120, for example, one such known utility is HWINFO. Such utilities are used as diagnostic tools to verify reported system data, and SPD data 120 is not used to assist in providing an upgrade recommendation, as is done in the present invention. Such utilities are thus typically limited to reading SPD data 120 from only a single make of chipset 20, and doing so is sufficient for the purpose of the utility.

The present invention, on the other hand, contemplates an SPD data reader (e.g., a software utility) capable of reading SPD data from various makes of chipsets 20. This may be accomplished by first detecting the make of the chipset 20 using low-level commands known in the art, then invoking the appropriate subroutine programmed according to specifications of the specific manufacturer of the chipset 20. This is advantageous because the present invention would be of limited value otherwise. Specifically, the present invention anticipates reading SPD data 120 from various makes of chipsets 20 because in practice the diversity of potential client computers to use the present invention would have various makes of SPD chips 60.

Task "b", represented by step 310b, is accessing motherboard parameters 75 from SMBIOS. Motherboard parameters 75 preferably include manufacturer ID and product ID. For example, manufacturer ID may correspond to "Compaq", and product ID may correspond to "Presario 5340". But motherboard parameters 75 may be any parameters that provide sufficient information to match up motherboard 10 with an entry in product specification database 90a during cross-referencing, as described herein. In fact, motherboard parameters 75 may be only a single parameter.

Task "c", represented by step 310c, is identification of the write-protect status (represented by 70 in FIG. 2) of an SPD chip located on memory module 25. For purposes of this discussion, the write-protect status is either "read/write" or "read only". "Read/write" means SPD chip is not write-protected, whereas "read only" means that the SPD chip is write-protected. Many SPD chips are "read/write", and are thus subject to malicious invasion by unwanted computer viruses.

Write-protect status 70 of a given SPD chip 60 is defined by the existence or non-existence of a certain pin or pin combination associated with SPD chip 60, as is well known in the art. To determine the write-protect status 70 of SPD chip 60 without performing a physical examination thereof, a low-level command may be issued to the operating system of the client computer, such as a command to open a specified area of SPD chip 60 for writing thereto. The return code received by the issuing command will indicate whether the SPD chip 60 is write protected. Typically, if SPD chip 60 is not write-protected (i.e., it has a "read/write status), the upgrade package recommended will include a memory module comprising a write-protected SPD chip. The specific SPD chip recommended may be based upon compatibility considerations identified during cross-referencing of SPD data 120 gathered at step 310a.

Task "d", represented by step 310d, is reading OS data such as system name/node ID, and/or OS version. Other OS data may be read, and such data may be chosen from a group of data consisting of a system name and an operating system version. Both system name and OS version may be obtained using low-level commands known in the art. This information may be used in various ways by implementation of the present invention. For example, if it is determined that the OS version on client computer 5 is Windows XP, and it is also determined that the RAM on client computer 5 is 64 MB, the recommended upgrade package could include additional RAM because industry or manufacturer standards require more than 64 MB RAM to run Windows XP. This may occur even if doing so might exceed the target hardware configuration.

The system name may be helpful for project management. For example, if a user is using the present invention to obtain hardware upgrade recommendations for multiple computers on a network, and the user is viewing reports related to the hardware upgrade recommendations, having the system name associated with each recommendation will allow the user to efficiently associate the report with the system/node at issue. Additionally, the physical components ordered by the user may be efficiently sorted, packaged, and labeled according to system name, so when the boxes/containers of components arrive at the installation location, they may be efficiently unpacked and properly allocated.

Task "e" refers to performing a test or tests to determine certain computer characteristics such as memory utilization and/or CPU speed. Other tests may be performed, but in one embodiment of the present invention the test(s) is/are from the group of tests consisting of a memory utilization test and a CPU speed test. This information may be used in various ways by implementation of the present invention. For example, if it is determined that the amount of memory on computer 5 is already equal to or greater than the amount of memory associated with the target hardware configuration, but results of memory utilization tests nonetheless show the installed memory is 85% utilized, the recommended upgrade package may include additional memory above the target amount. In another example, if CPU 15 is tested and is not running at the speed SMBIOS suggests is achievable, there may be a problem in the configuration of the system. The problem could be as simple as a Turbo button found on many older systems not being activated. Reporting this to the user as part of the recommended upgrade package may result in the problem being easily addressed by the user, who may then experience an immediate increase in system performance.

Turning now to step 320, upgrade program 85 establishes a target hardware configuration of client computer 5. The target hardware configuration may be based on industry standards, user preferences, vendor recommendations, or any other information. A target hardware configuration may be manually input into upgrade program 85, or it may be downloaded or read from a data source. Factors that may be considered in establishing a target hardware configuration include economic factors, the computer's intended application, product availability, and operating system characteristics and parameters. For example, in a network-based use of the present invention, target hardware configurations may be established for all computers on the network substantially simultaneously. This may occur in a situation in which corporate guidelines require each computer on the network to have a minimum amount of RAM, such as 512 MB. Thus, the target configuration for each computer will be the same, namely to have 512 MB of RAM.

As used herein, "establishing" a target hardware configuration may occur by identifying, obtaining, reading, creating, receiving, calculating, determining, or simply verifying information. The target hardware configuration may even be open-ended or qualitative, such as "the maximum power, speed, and memory capacity possible", in which case program 85 can quantify the target configuration based on known parameters. In each instance, the target hardware configuration thus defines parameters within which the upgrade package should be identified.

Once the current hardware configuration of client computer 5 and the target hardware configuration of client computer 5 are known, the two configurations are compared at step 330 to determine the difference and identify an upgrade package for upgrading client computer 5 to the target hardware configuration. For example, if the current configuration of client computer is 128 MB of RAM, and the target configuration requires 512 MB of RAM, then the difference between the two is 384 MB of RAM. In this example, an upgrade package may be identified which includes three 128 MB memory modules to add to client computer 5. Alternatively, the upgrade package may be identified which includes two 256 MB memory modules to replace the already existing 128 MB module. The different options may take into consideration cost, physical restraints of client computer 5, product availability or promotions, or other information.

An upgrade package may be simply a single new component, or a single replacement component. An upgrade package may also include multiple components. The package may include specific components that may be ordered using a one-click confirmation. Upgrade packages may be sorted, boxed, and shipped, such that each package is identified by the computer name, network name, or other identifying indicia, to facilitate convenient installation of the upgrade components.

At step 340, a recommendation is provided to use the upgrade package for upgrading client computer 5. Conceptually, recommending the upgrade package may be accomplished by recommend module 110. Typically, the recommendation is provided via a display monitor associated with client computer 5. Recommendations may also be provided through direct mailings, telephone or email notification, and/or any other convenient means of information transmission. The recommendation is based at least partially upon information gathered by detect module 100 at step 310, and may involve cross-referencing the information with product specifications in a database 90a, to ensure a high degree of accuracy and component compatibility. The information may include any or all of: 1) SPD data 120 from SPD chip 60 of client computer 5; 2) motherboard parameters 75; 3) a write-protect status 70 of SPD chip 60; 4) other OS data, such as system name and/or operating system version; and 5) results of tests to determine certain computer characteristics such as memory utilization and/or CPU speed. The process ends at step 350.

As previously stated, as part of or in addition to detecting step 310 and/or recommending step 340, in many instances the data gathered by detect module 100 will be cross-referenced with a product specification database 90a to more accurately determine the current hardware configuration of client computer 5. Product specification database 90a stores specifications for many or all known hardware components, including compatibility restrictions with other hardware components. In this manner, a particular product with exacting specifications may be recommended based upon the current hardware configuration of client computer 5 as accurately determined by the present invention.

For example, when cross-referencing the data gathered related to motherboard 10, the memory expansion slot capability of motherboard 10 may be determined from database 90a. Since such determination is based on the product specifications of the specific motherboard, and not on chipset data 125 stored in SMBIOS area 65, the information is accurate and may be relied upon in providing an upgrade recommendation. Cross-referencing may be accomplished by cross-reference module 115 of upgrade program 85, using programming logic well-known in the art.

For example, assume the user desires to have RAM upgraded in client computer 5. Generally, hardware suppliers stock RAM modules from a variety of manufacturers having wide variations in their working specifications or parameters. Any number of the RAM modules may fit the general requirements of the user's upgrade request, but only a few of the available RAM modules will provide the most compatible, accurate, efficient, and reliable hardware component upgrade. Referring to step 310b, in which SPD data 120 is accessed, SPD data 120 is cross-referenced to product database 90a to ensure the recommended RAM not only meets the general requirements of the target configuration (i.e., capacity), but also the compatibility with the current hardware of client computer.

A further consideration in the same example may be whether client computer 5 actually has the physical capacity to accept the target configuration. For example, the target configuration of client computer 5 may call for increasing RAM. Assume motherboard 10 of client computer 5 was designed with three memory module slots capable of a predetermined amount of memory capacity. Further assume chipset 20 of client computer 5 was designed to support a memory capacity greater than that of motherboard 10. This is not uncommon, because chipsets 20 cannot be matched to every possible computer configuration available. Thus, generally, a computer manufacturer will find it more economical to produce a general chipset 20 that can be easily installed in a wide range of computer configurations.

Since chipset data 125 relates to chipset 20's own memory module capacity, not the memory module capacity of motherboard 10, if a memory module upgrade recommendation is based on chipset data 120, the upgrade package may include a memory module that motherboard 10 cannot physically receive. The present invention solves this problem by accessing motherboard parameters 75 from SMBIOS, and cross-referencing the parameters 75 with product specification database 90a, to determine the true memory module capacity of motherboard 10. Using motherboard parameters 75 of motherboard 10 (typically manufacturer ID and product ID), instead of chipset data 120, a more compatible, accurate, efficient, and reliable determination of an upgrade package is accomplished.

Referring back to FIG. 2, a block diagram of upgrade program 85 is shown. The method as previously described in connection with FIG. 3 may be implemented by a system including: a detect module 100 for detecting a current hardware configuration of client computer 5; a compare module 105 for comparing the current hardware configuration to a target hardware configuration to identify an upgrade package for upgrading client computer 5 to the target hardware configuration; and a recommend module 110 for providing a recommendation to use the upgrade package for upgrading client computer 5. An optional cross-reference module 115 is used for cross-referencing information about the current configuration of client computer 5, gathered by the detect module 100, with a product information database 90a.

In one embodiment of the present invention, detect module 100 performs at least one task from the group of tasks consisting of (a, b, c) to gather information associated with client computer 5, wherein "a" is accessing SPD data 120 from SPD chip 60 of client computer 5, "b" is accessing motherboard parameters 75 from the memory of client computer 5, said parameters 75 comprising a manufacturer ID and a product ID of motherboard 10, and "c" is determining a write-protect status (represented by 70) of SPD chip 60. Compare module 105 compares the current hardware configuration to a target hardware configuration to identify an upgrade package for upgrading client computer 5 to the target hardware configuration, said identification being based at least partially upon the information gathered from detect module 100. Recommend module 110 recommends use of the upgrade package for upgrading client computer 5. Optional cross-reference module 115 cross-references the information gathered by detect module 100, with product specifications in database 90a. Modules 100, 105, 110, and 115 are typically embodied in an executable computer program. Modules 100, 105, 110, and 115 perform tasks as described herein in connection with FIG. 3.

In certain situations, it may be desirable to reestablish the target hardware configuration, after establishing the target hardware configuration initially at step 320. In such situations, step 320 may be repeated as often as necessary, and step 330 is performed by comparing the current hardware configuration with the reestablished target configuration. Similarly, the current hardware configuration may need to be re-detected multiple times. For example, after initial detection at step 310, the user may remove or install hardware components of the client computer, so the "current" configuration previously detected is no longer accurate.

Thus, prior to performing the compare at step 330, the update program may confirm that the current configuration(s) detected at step 310 and the target configuration(s) established at step 320 are still valid. This may be accomplished, for example, manually, or by issuing reminders or confirmation queries to the client computer(s) or a project management computer and waiting a designated time for a response. Alternatively, the program may automatically re-detect the current configuration just prior to performing the compare at step 330, if a designated amount of time has elapsed since the previous "current hardware configuration" was detected. Once the confirmation is complete, the current hardware configuration(s) (or reestablished current hardware configuration(s)) may be compared to the target hardware configuration(s) (or reestablished target hardware configuration(s)) to identify an upgrade package or packages (or reestablished upgrade package(s)) for upgrading the client computer(s) to the target hardware configuration(s) (or reestablished target hardware configuration(s)). The upgrade package(s) (or reestablished upgrade package(s)) is/are then recommended at step 340, still based at least partially upon the information gathered at the detecting step 310.

It should be understood that the upgrade program 85 may be integrated with existing asset management software and/or analyzer software tools to present one or more upgrade possibilities (e.g., upgrade packages). In this regard, the upgrade program 85 can be used with existing asset management/analyzer tools to provide a value-added service of suggesting to the user(s) intelligent upgrade possibilities.

While certain embodiments are illustrated in the drawings and are described herein, including preferred embodiments, it will be apparent to those skilled in the art that the specific embodiments described herein may be modified without departing from the inventive concepts described. For example, though processes of the present invention are illustrated and/or described herein with steps occurring in certain orders, the specific order of the steps is not necessarily required, because certain steps are not dependent on certain other steps. For example, referring to FIG. 3, step 320 may occur before or simultaneously with step 310, as the two steps are independent of each other. Also for example, while the present invention has been described as providing hardware upgrade recommendations, the present invention may also be used in combination with providing software upgrade recommendations. Accordingly, Applicant's invention as described herein is not to be restricted, except in accordance with the law by the claims which follow.

What is claimed is:

1. A method of providing upgrade information for a plurality of networked computers comprising the steps of:

executing an upgrade program stored in a computer-readable medium on one of the plurality of networked computers;

detecting a current hardware configuration of the plurality of networked computers, including gathering information associated with the plurality of networked computers;

cross-referencing at least some of the information gathered during the detecting step for each of the plurality of networked computers with product specifications contained in a database;

identifying an upgrade package for upgrading hardware of at least some of the plurality of networked computers, wherein the identification of the upgrade package is based at least partially upon the information gathered during the detecting step and cross-referenced with the product specification database and at least partially on a target hardware configuration; and recommending use of the upgrade package for upgrading the hardware of the at least some of the plurality of networked computers;

wherein a single target hardware configuration is established for each of the plurality of networked computers; and wherein the step of detecting a current hardware configuration of the plurality of networked computers comprises performing a task from a group of tasks; wherein the group tasks comprising:
(a) accessing serial presence detect (SPD) data;
(b) accessing motherboard parameters;
(c) determining a write-protect status of the SPD;
(d) reading operating system data; and
(e) determining memory utilization and CPU speed.

2. A method of providing upgrade information for a plurality of networked computers comprising the steps of:

executing an upgrade program stored in a computer-readable medium on one of the plurality of networked computers;

detecting a current hardware configuration of the plurality of networked computers, including gathering information associated with the plurality of networked computers;

cross-referencing at least some of the information gathered during the detecting step for each of the plurality of networked computers with product specifications contained in a database;

identifying an upgrade package for upgrading hardware of at least some of the plurality of networked computers, wherein the identification of the upgrade package is based at least partially upon the information gathered during the detecting step and cross-referenced with the product specification database and at least partially on a target hardware configuration; and recommending use of the upgrade package for upgrading the hardware of the at least some of the plurality of networked computers; and packaging one or more hardware components of the upgrade package, wherein a single package is used for each computer in the plurality of networked computers where upgrading was recommended;

wherein the step of detecting a current hardware configuration of the plurality of networked computers comprises performing a task from a group of tasks; wherein the group of tasks comprising:
(a) accessing serial presence detect (SPD) data;
(b) accessing motherboard parameters;
(c) determining a write-protect status of the SPD;
(d) reading operating system data; and
(e) determining memory utilization and CPU speed.

3. The method of claim 2, wherein the package is marked to identify the specific computer where upgrading was recommended.

* * * * *